United States Patent
Wu et al.

(10) Patent No.: US 10,278,165 B2
(45) Date of Patent: Apr. 30, 2019

(54) SYSTEM, METHOD, AND DEVICE FOR PROCESSING AIR INTERFACE INFORMATION

(71) Applicant: Huawei Technologies Co., Ltd., Shenzhen, Guangdong (CN)

(72) Inventors: Jianjun Wu, Munich (DE); Chenghui Peng, Shanghai (CN); Wei Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 147 days.

(21) Appl. No.: 14/680,866

(22) Filed: Apr. 7, 2015

(65) Prior Publication Data

US 2015/0215918 A1 Jul. 30, 2015

Related U.S. Application Data

(63) Continuation of application No. PCT/CN2013/074079, filed on Apr. 11, 2013.

(30) Foreign Application Priority Data

Oct. 8, 2012 (CN) .......................... 2012 1 0377527

(51) Int. Cl.
*H04W 72/04* (2009.01)
*H04W 24/10* (2009.01)
(Continued)

(52) U.S. Cl.
CPC ......... *H04W 72/042* (2013.01); *H04W 24/10* (2013.01); *H04W 72/0433* (2013.01);
(Continued)

(58) Field of Classification Search
CPC .................................................. H04W 72/042
See application file for complete search history.

(56) References Cited

U.S. PATENT DOCUMENTS 6,714,987 B1 * 3/2004 Amin ................ H04L 29/06027
709/200
8,121,126 B1 * 2/2012 Moisand ................ H04L 45/50
370/392
(Continued)

FOREIGN PATENT DOCUMENTS

CN         1969578 A     5/2007
CN      101262277 A     9/2008
(Continued)

OTHER PUBLICATIONS

Ali Abu-Rgheff Mosa, "Access network UTRAN, Introduction to CDMA Wireless Communications", Sep. 10, 2007, p. 551-554.
(Continued)

*Primary Examiner* — Raj Jain
*Assistant Examiner* — Andrew C Lee

(57) ABSTRACT

Embodiments of the present invention provide a system, method, and device for processing air interface information. An enhanced base station includes: a receiver, configured to receive, through an open interface, an air interface control policy sent by a radio access network controller having an air interface control function of a radio access network; and a processor, configured to process air interface user plane data according to the air interface control policy. The technical solutions provided by the embodiments of the present invention implement separation of a control plane and a user plane of the radio access network through the radio access network controller and the enhanced base station.

29 Claims, 11 Drawing Sheets

(51) Int. Cl.
*H04W 92/12* (2009.01)
*H04W 72/08* (2009.01)
*H04W 92/10* (2009.01)
*H04W 36/00* (2009.01)

(52) U.S. Cl.
CPC ........ *H04W 92/12* (2013.01); *H04W 36/0011* (2013.01); *H04W 72/085* (2013.01); *H04W 72/087* (2013.01); *H04W 92/10* (2013.01)

(56) References Cited

U.S. PATENT DOCUMENTS

| | | | | |
|---|---|---|---|---|
| 8,411,583 | B2* | 4/2013 | Chun | H04L 1/1685 370/252 |
| 8,488,634 | B2* | 7/2013 | Novak | H04W 56/00 370/252 |
| 8,769,308 | B2 | 7/2014 | Mukherjee et al. | |
| 8,792,876 | B1* | 7/2014 | Zhu | H04L 12/4641 370/338 |
| 9,154,994 | B2* | 10/2015 | Fox | H04W 28/08 |
| 9,473,986 | B2* | 10/2016 | Tomici | H04L 45/123 |
| 2003/0026232 | A1* | 2/2003 | Uskela | H04L 47/14 370/341 |
| 2003/0208601 | A1* | 11/2003 | Campbell | H04W 76/25 709/227 |
| 2004/0037320 | A1* | 2/2004 | Dickson | H04L 29/06 370/473 |
| 2004/0147236 | A1* | 7/2004 | Parkvall | H04L 1/1628 455/560 |
| 2004/0224698 | A1* | 11/2004 | Yi | H04W 76/02 455/450 |
| 2005/0068967 | A1 | 3/2005 | Terry et al. | |
| 2005/0122900 | A1 | 6/2005 | Tuulos et al. | |
| 2006/0187881 | A1* | 8/2006 | Kwak | H04L 29/12311 370/331 |
| 2006/0187882 | A1* | 8/2006 | Kwak | H04W 36/005 370/331 |
| 2006/0251027 | A1* | 11/2006 | Chun | H04W 74/004 370/335 |
| 2007/0254671 | A1 | 11/2007 | Liu | |
| 2007/0275728 | A1* | 11/2007 | Lohr | H04L 1/1812 455/450 |
| 2008/0188219 | A1* | 8/2008 | Fischer | H04W 74/008 455/434 |
| 2008/0267126 | A1* | 10/2008 | Vujcic | H04B 7/2637 370/330 |
| 2008/0280611 | A1 | 11/2008 | Miklos et al. | |
| 2008/0293353 | A1* | 11/2008 | Mody | H04K 3/226 455/1 |
| 2008/0305819 | A1* | 12/2008 | Chun | H04W 72/042 455/509 |
| 2008/0310338 | A1* | 12/2008 | Charpenter | H04L 1/1671 370/315 |
| 2009/0023453 | A1 | 1/2009 | Hu et al. | |
| 2009/0049159 | A1* | 2/2009 | Boscovic | H04W 88/06 709/221 |
| 2009/0052384 | A1* | 2/2009 | Zisimopoulous | H04L 47/14 370/329 |
| 2009/0270099 | A1* | 10/2009 | Gallagher | H04W 8/08 455/435.1 |
| 2010/0074109 | A1* | 3/2010 | Klingenbrunn | H04W 76/10 370/230 |
| 2010/0093364 | A1* | 4/2010 | Ribeiro | H04W 72/082 455/452.2 |
| 2010/0111010 | A1* | 5/2010 | Wu | H04W 76/28 370/329 |
| 2010/0188975 | A1* | 7/2010 | Raleigh | G06Q 10/06375 370/230.1 |
| 2011/0038264 | A1* | 2/2011 | Ishii | H04L 47/10 370/238 |
| 2011/0075675 | A1* | 3/2011 | Koodli | H04L 12/14 370/401 |
| 2011/0170411 | A1* | 7/2011 | Wang | H04W 76/10 370/235 |
| 2011/0170495 | A1* | 7/2011 | Earnshaw | H04W 72/02 370/329 |
| 2011/0188457 | A1* | 8/2011 | Shu | H04W 28/24 370/329 |
| 2011/0228750 | A1* | 9/2011 | Tomici | H04W 8/082 370/338 |
| 2012/0002608 | A1* | 1/2012 | Vesterinen | H04W 8/082 370/328 |
| 2012/0063414 | A1* | 3/2012 | Ramachandran | H04W 36/0022 370/331 |
| 2012/0082146 | A1* | 4/2012 | Andreasen | H04L 12/4633 370/338 |
| 2012/0166618 | A1* | 6/2012 | Dahod | H04L 47/20 709/224 |
| 2012/0176987 | A1* | 7/2012 | Kaminski | H04L 5/0053 370/329 |
| 2012/0230293 | A1* | 9/2012 | Grinshpun | H04W 36/0016 370/331 |
| 2012/0275323 | A1* | 11/2012 | Reznik | H04L 47/10 370/252 |
| 2012/0281566 | A1* | 11/2012 | Pelletier | H04W 76/27 370/252 |
| 2012/0303835 | A1* | 11/2012 | Kempf | H04W 24/02 709/235 |
| 2012/0315949 | A1* | 12/2012 | Zhang | H04W 24/08 455/525 |
| 2013/0016696 | A1* | 1/2013 | Adjakple | H04W 76/025 370/331 |
| 2013/0054761 | A1* | 2/2013 | Kempf | H04L 12/4633 709/220 |
| 2013/0137469 | A1* | 5/2013 | Schmidt | H04W 74/006 455/466 |
| 2013/0155948 | A1* | 6/2013 | Pinheiro | H04W 4/005 370/328 |
| 2013/0208605 | A1* | 8/2013 | Bautista | H04W 36/14 370/252 |
| 2013/0322351 | A1* | 12/2013 | Tavildar | H04W 16/10 370/329 |
| 2014/0003337 | A1* | 1/2014 | Majmundar | H04W 48/06 370/328 |

FOREIGN PATENT DOCUMENTS

RU 2429590 C2 9/2011
WO WO 2012/070173 A1 5/2012

OTHER PUBLICATIONS

Heikki Kaaranen, et al., "Part Three UMTS Networks: Architecture, Mobility and Services", Nov. 20, 2005, p. 287-349.

* cited by examiner

SYSTEM, METHOD, AND DEVICE FOR PROCESSING AIR INTERFACE INFORMATION

CROSS-REFERENCE TO RELATED APPLICATIONS

This application is a continuation of International Application No. PCT/CN2013/074079, filed on Apr. 11, 2013, which claims priority to Chinese Patent Application No. 201210377527.7, filed on Oct. 8, 2012, both of which are hereby incorporated by reference in their entireties.

TECHNICAL FIELD

The present invention relates to communication technologies, and in particular, to a system, method, and device for processing air interface information.

BACKGROUND

A conventional radio cellular network, such as a 2G/3G/4G communication network, mainly includes two parts: a core network and an access network. A radio access network is mainly formed by base station(s) (eNodeB), where each eNodeB is mainly responsible for radio resource management, IP data packet header compression, air interface encryption and decryption, and so on. The interface between a user equipment (User Equipment, UE for short) and an eNodeB is an air interface. A protocol stack of the air interface may be divided into three layers: a physical layer (L1), a data link layer (L2), and a network layer (L3). The L1 is mainly used to provide a physical radio channel for transmitting higher-layer service(s). The L2 mainly includes three sub-layers, that is, a media access control (Media Access Control, MAC for short) sub-layer, a radio link control (Radio Link Control, RLC for short) sublayer, and a packet data convergence protocol (Packet Data Convergence Protocol, PDCP for short) sublayer. The interface between the L2 and the lowest sub-layer of the sub-layers of the L3 is marked as a radio resource control layer (Radio Resource Control, RRC for short), and higher-layer signaling of mobility management (Mobility Management, MM for short), call control (Call Control, CC for short), and the like, belongs to a non-access stratum and belongs falls within the scope of the core network.

From perspectives of a control plane (C-plane) and a user plane (U-plane), the layers of the air interface on the control plane and the user plane are mixed, and separation is not realized. At present, a solution for separating the control plane from the user plane is mainly directed to the IP layer and layers above the IP layer. As a result, the solution mainly improves the layers of the core network in the radio network, and does not incorporate the radio access network into the management scope, and does not realize separation of the bearer and control of the radio access network. Therefore, overall network performance is affected.

SUMMARY

The present invention provides a system, method, and device for processing air interface information, so as to implement separation of a control plane and a user plane of a radio access network.

In one aspect, an enhanced base station is provided and includes: a receiver, configured to receive, through an open interface, an air interface control policy sent by a radio access network controller having an air interface control function of a radio access network, where the air interface control policy is generated by the radio access network controller, and the open interface is an interface between the enhanced base station and the radio access network controller; and a processor, configured to process air interface user plane data according to the air interface control policy.

In another aspect, a radio access network controller is provided, where the radio access network controller has air interface control functions of a radio access network and includes:

a processor, configured to generate an air interface control policy; and a transmitter, configured to send the air interface control policy to an enhanced base station through an open interface, so that the enhanced base station processes air interface user plane data according to the air interface control policy;

where the open interface is an interface between the radio access network controller and the enhanced base station.

In still another aspect, a system for processing air interface information is provided and includes: a radio access network controller and an enhanced base station, where:

the radio access network controller has air interface control functions of a radio access network, and is configured to generate an air interface control policy, and send the air interface control policy to the enhanced base station through an open interface, where the open interface is an interface between the radio access network controller and the enhanced base station; and the enhanced base station is configured to receive the air interface control policy through the open interface, and process air interface user plane data according to the air interface control policy.

In still another aspect, a method for processing air interface information is provided and includes:

generating, by a radio access network controller, an air interface control policy, where the radio access network controller has air interface control functions of a radio access network; and sending, by the radio access network controller, the air interface control policy to an enhanced base station through an open interface, so that the enhanced base station processes air interface user plane data according to the air interface control policy.

In still another aspect, a method for processing air interface information is provided and includes:

receiving, by an enhanced base station through an open interface, an air interface control policy sent by a radio access network controller having an air interface control function of a radio access network, where the air interface control policy is generated by the radio access network controller; and processing, by the enhanced base station, air interface user plane data according to the air interface control policy.

As can be seen above, by using the system, method, and device for processing air interface information according to the embodiments of the present invention, a radio access network controller has air interface control functions of a radio access network; the radio access network controller is responsible for generating an air interface control policy and sending the air interface control policy to an enhanced base station; the enhanced base station is responsible for processing air interface user plane data according to the air interface control policy; the radio access network controller is responsible for processing the control plane function at the air interface of the radio access network; the enhanced base station is responsible for processing the air interface user plane function of the radio access network, thereby implementing separation of the control plane and the user plane of the radio access network.

BRIEF DESCRIPTION OF THE DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

To implement separation of the control plane and the user plane of a radio access network and incorporate the radio access network into the management scope, the technical solutions of the present invention propose a network architecture and solution for separating the control plane and the user plane of the radio access network. The core idea of the solution is as follows: Radio L2 and L3 control plane functions are stripped from a base station in an access network and implemented by an independent functional entity, and end-to-end management is implemented for user bearers in cooperation with the control plane of a core network, while radio L2 and L3 user plane functions are implemented by an independent functional entity and are mainly responsible for completing air interface user plane data processing, where the air interface user plane data processing includes: data transmission, data segmentation, concatenation, sequencing, reassembly, discarding, compression and decompression of data packet headers, and data security protection such as data encryption/decryption and integrity protection.

Figure 1A:
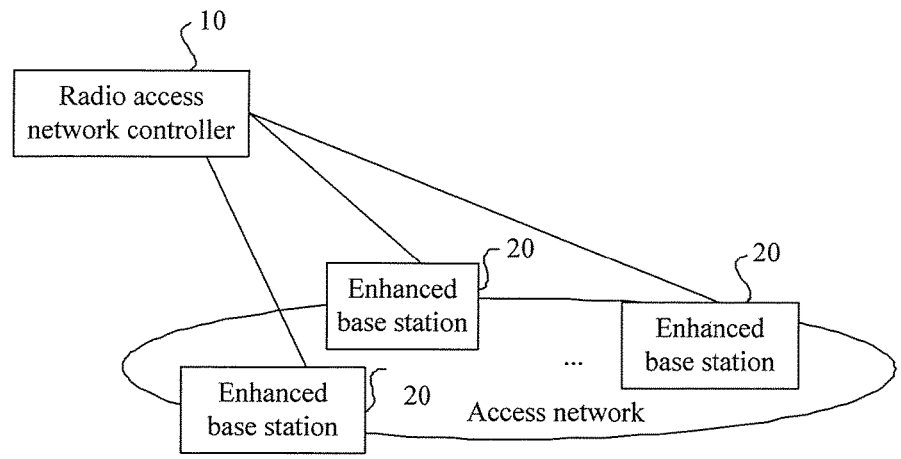
FIG. 1A is a schematic structural diagram of a system for processing air interface information according to an embodiment of the present invention.

FIG. 1A is a schematic structural diagram of a system for processing air interface information according to an embodiment of the present invention. As shown in FIG. 1A, the system of this embodiment includes: a radio access network controller 10 and an enhanced base station 20.

The radio access network controller 10 has air interface control functions of a radio access network, and is mainly configured to generate an air interface control policy, and send the air interface control policy to the enhanced base station 20 through an open interface. The enhanced base station 20 is configured to receive, through the open interface, the air interface control policy sent by the radio access network controller 10, and process air interface user plane data according to the air interface control policy.

The radio access network controller 10 and the enhanced base station 20 are located in the radio access network. The radio access network controller 10 is a control plane network element in the radio access network, namely, an air interface control plane network element, and is mainly configured to control, through the air interface control policy, the enhanced base station 20 to complete processing of the air interface user plane data, specifically including the stripped radio L2 and L3 protocol control plane functions. The radio L2 and L3 protocol control plane functions include but are not limited to: radio resource allocation, uplink/downlink scheduling, scheduling priority selection, Hybrid Automatic Repeat Request (HARQ) retransmission, Radio Link Control (RLC) connection control and management, protocol error detection and recovery, control plane protocol encryption and decryption, broadcast, paging, Radio Resource Control (RRC) connection) connect on management, radio bearer management, mobility management, key management, UE measurement reporting and control, Multimedia Broadcast Multicast Service (HEMS) control, NAS message direct transfer, Quality of Service (QoS) management, and so on.

The enhanced base station 20 is a user plane network element in the radio access network and is control led by the radio access network controller at the air interface layer (or at the Radio layer). It mainly completes processing of air interface user plane data under control of the radio access network controller 10. Specifically, it integrates processing functions of all user planes at the radio L2 and L3s, and usually has only the user plane function. The processing functions of all user planes at the radio L2 and L3s include but are not limited to: data transmission, data segmentation, concatenation, sequencing, reassembly, discarding, compression and decompression of data packet headers, and data security protection such as data encryption/decryption and integrity protection. In this embodiment, the enhanced base station 20 may be various radio base stations of different standards, for example, various macro base stations and micro base stations. In the radio access network, the quantity of enhanced base stations 20 is large, that is, one radio access network controller 10 may control multiple enhanced base stations 20 simultaneously, and multiple enhanced base stations 20 are connected to one radio access network controller 10 through an open interface and are controlled by the radio access network controller 10.

The interface between the radio access network controller 10 and the enhanced base stations 20 is an open interface, and may also be referred to as an open radio (Open Radio) interface, but is not limited to the Open Radio interface name. The Open Radio interface is used to enable the enhanced base station 20 to implement, under control of the radio access network controller 10, an air interface user plane function of the radio access network, that is, the air interface control functions of the radio access network are open to the radio access network controller 10 through the Open Radio interface. Herein the opening is relative to the prior art. The air interface control functions in the prior art are implemented as a package in an enhanced base station (eNodeB) in an LTE system, and are implemented as a package in a base station (NodeB) or a radio network controller (RNC) in a UMTS system. In this embodiment, all or a part of the air interface control functions are centralized to an independent network element and implemented thereon, that is, implemented by the radio access network controller 10, which is equivalent to opening the air interface control functions of the existing eNodeB or the NodeB and RNC to the radio access network controller 10 in this embodiment. Thereby, relatively centralized control may be implemented, and the control procedure and the like may also become simpler. The Open Radio interface mainly bears the air interface control plane policy. Because the L2 and L3 control plane functions of all air interfaces in the access network are centralized in the radio access network controller 10 for processing, and the enhanced base station 20 is only responsible for the corresponding user plane function, when air interface control is involved, it is necessary to use the Open Radio interface to bear the air interface control policy. The air interface control includes but is not limited to scheduling of air interface resources (such as QoS control), paging, broadcast, and so on. To be specific, the radio L2 and L3 control plane functions that the radio access network controller 10 has, all need to be sent to the enhanced base station 20 through the Open Radio interface. In addition, the enhanced base station 20 may also actively request some control policies from the radio access network controller 10 through the Open Radio interface. That is, the enhanced base station 20 is further configured to send an air interface policy request to the radio access network controller 10 before receiving an air interface control policy. Thereby, the radio access network controller 10 generates the air interface control policy according to the air interface policy request, and sends the air interface control policy to the enhanced base station 20.

Herein it is noted that some basic procedures implemented through cooperation between the radio access network controller 10 and the enhanced base station 20, such as bearer setup, mobility management, and so on, are similar to those in the prior art, and are not described herein.

Figure 1B:
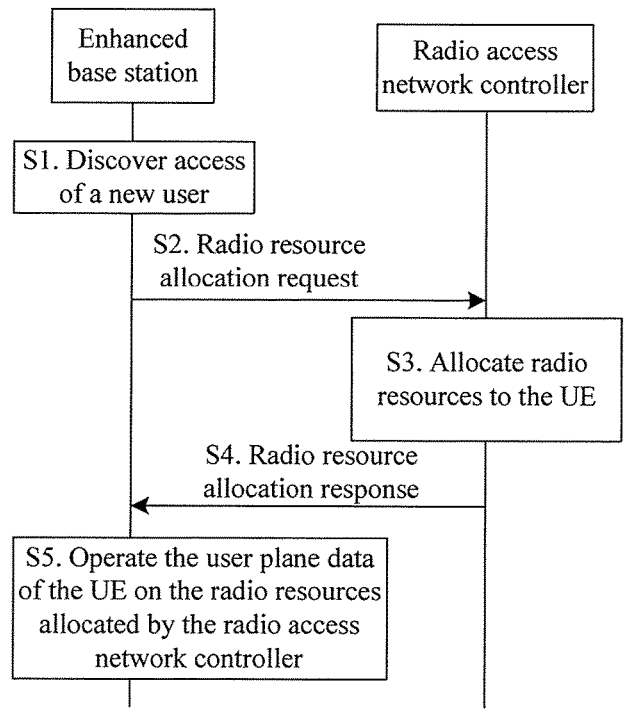
FIG. 1B is an exemplary flowchart of completing separation of a bearer and control by a radio access network controller and an enhanced base station in cooperation according to an embodiment of the present invention.

The following uses an example to describe how the radio access network controller 10 and enhanced base station 20 cooperate with each other to complete the whole process of separating a bearer and control. Assuming that a new user accesses a network, the enhanced base station 20 to which the UE of the user is currently connected triggers the radio access network controller 10 to allocate radio resources to the user. As shown in FIG. 1B, the specific procedure includes:

Step S1: A user accesses the network; the enhanced base station 20 discovers the new user, and determines that it is necessary to request radio resources for the UE of the user.

Step S2: Because the enhanced base station 20 has only a user plane function and does not have a control plane resource allocation function, the enhanced base station 20 sends a radio resource allocation request to the radio access network controller 10 through an Open Radio interface, where the radio resource allocation request carries a user identifier of the UE, so that the radio access network controller 10 performs storage and subsequent identification.

Step S3: After receiving the radio resource allocation request, the radio access network controller 10 may obtain UE related information from a side of core network according to the user identifier of the UE, and then allocate radio resources to the UE according to information such as usage of locally stored radio resources and obtained UE related information. Herein the radio resources may be a certain quantity of channels, timeslots, even transmission priorities, and so on.

Step S4: The radio access network controller 10 sends a radio resource allocation response to the enhanced base station 20, where the radio resource allocation response includes the resource allocation result.

Step S5: After receiving the radio resource allocation response, the enhanced base station 20 operates the user plane data of the UE on the radio resources allocated by the radio access network controller 10, such as transmitting data packet(s), and so on.

In this implementation manner, the radio resource allocation request is an air interface policy request, and the radio resource allocation result is an air interface control policy.

Figure 1C:
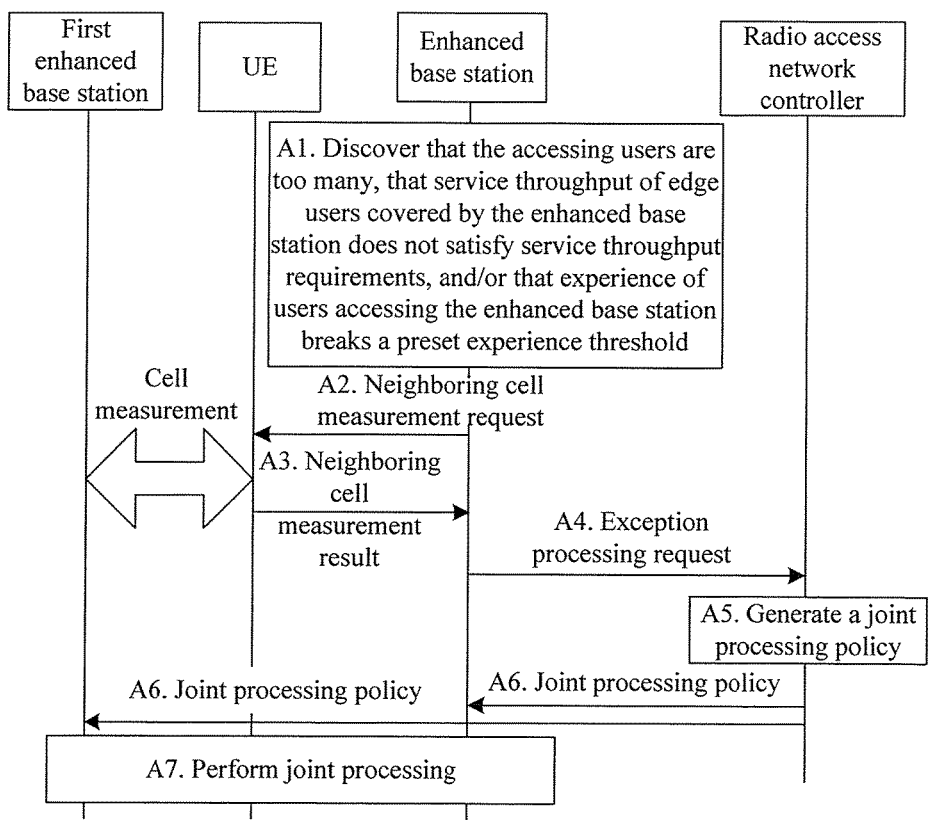
FIG. 1C is another exemplary flowchart of completing separation of a bearer and control by a radio access network controller and an enhanced base station in cooperation according to an embodiment of the present invention.

The following uses another example to describe how the radio access network controller 10 and enhanced base station 20 cooperate with each other to complete the whole process of separating a bearer and control. When there are too many accessing users in the coverage of an enhanced base station 20, the enhanced base station 20 is overloaded, and QoS experience of users and especially cell edge users is affected greatly. In addition, resource insufficiency of enhanced base stations 20 and so on may cause poor QoS experience of cell edge users, and cause the experience to break a preset experience threshold, for example, the delay of receiving a service by a user is greater than a preset delay threshold, or the definition of a video/voice service received by a user is smaller than a preset definition threshold. In the above situation, the fairness problem of cell edge users may be solved by forcing the cell edge users to implement a multi-base-station joint processing technology. To implement the process, the cooperation between the radio access network controller 10 and the enhanced base station 20 is required. As shown in FIG. 1C, the specific procedure includes:

Step A1: The enhanced base station 20 discovers that the accessing users are too many in the coverage of the enhanced base station 20, that service throughput of edge users covered by the enhanced base station does not satisfy service throughput requirements, and/or that experience of users accessing the enhanced base station breaks a preset experience threshold, that is, discovers that the current situation satisfies at least one of the above preset trigger conditions.

Step A2: The enhanced base station 20 sends a neighboring cell measurement request to a UE, triggering the UE to perform a process of measuring neighboring cell(s). Herein the measuring neighboring cells mainly refers to a process of obtaining various parameters that can reflect the current performance states of neighboring cells, for example, including measuring signal strength of neighboring cells, measuring the quantity of UEs in the neighboring cells, and so on.

Step A3: The UE reports a neighboring cell measurement result to the enhanced base station 20. In this embodiment, a neighboring cell of the UE is a first enhanced base station, which is only used as an example for description. Actually, the UE may have multiple neighboring cells.

Step A4: The enhanced base station 20 sends an exception processing request to the radio access network controller 10, where the exception processing request includes the neighboring cell measurement result and further includes information about insufficiency of user resources and so on.

Step A5: The radio access network controller 10 generates a joint processing policy after receiving the exception processing request sent by the enhanced base station 20. Specifically, the radio access network controller 10 may generate a joint processing policy according to information such as a neighboring cell topology and the neighboring cell measurement result of the enhanced base station 20, and locally stored backhaul (backhaul).

In the step A5, the radio access network controller 10 may generate different processing policies according to the actual situation, for example, deciding to migrate the cell edge users of the enhanced base station 20 to a neighboring idle cell (referred to as a cell migration policy), or deciding to keep the enhanced base station 20 in the current state, and so on. In this embodiment, the radio access network controller 10 decides to implement multi-cell joint processing for the enhanced base station 20, which is used as an example for description. In the deciding process, the radio access network controller 10 not only decides to implement multi-cell joint processing for the enhanced base station 20, but also decides other information related to the joint processing, for example, which enhanced base stations are involved, which joint processing algorithm is used, which types of information can be shared by enhanced base stations, and so on. In this embodiment, the radio access network controller 10 selects the enhanced base station 20 and the first enhanced base station for joint processing, which is used as an example, while for the joint processing algorithm, various joint processing algorithms in the prior art may be selected.

Step A6: The radio access network controller 10 sends a joint processing policy to the enhanced base station 20 and the first enhanced base station.

Step A7: The enhanced base station 20 and the first enhanced base station perform joint processing for the UE according to the joint processing policy sent by the radio access network controller 10.

Herein it is noted that if the processing policy generated by the radio access network controller 10 in step A5 is migrating edge users to a neighboring cell, the subsequent steps include the following: The radio access network controller 10 sends the generated control policy to the enhanced base station (namely, a source enhanced base station), where the control policy includes detailed content of the policy (namely, migrating the edge users to the neighboring cell) and an identifier of an enhanced base station to which the edge users are migrated (namely, a destination enhanced base station), and so on. Meanwhile, the radio access network controller 10 further sends similar control policies to the enhanced base station of the neighboring cell to which the edge users will be migrated, notifying the enhanced base station of the cell that new users will be migrated to the cell, while the source enhanced base station and the enhanced base station to which the edge users will be migrated start executing the handover process of the edge users, and the process is similar to the handover of users in the prior art, and is not further described herein.

The exception processing request is an air interface policy request; and correspondingly, the joint processing policy or the cell migration policy is an air interface control policy.

In addition to the above radio resource allocation control and joint processing control, similar procedures may be used by the radio access network controller 10 to control other operations of the enhanced base station 20, for example, controlling data encryption modes, controlling scheduling priorities, controlling multicast and broadcast, and so on. In brief, all the control plane functions that the radio access network controller 10 has may be transferred to the enhanced base station 20 by using similar procedures. The control process may be triggered by the request of the enhanced base station 20, or the radio access network controller 10 may also actively send the control policy to the enhanced base station 20, while the enhanced base station 20 is responsible for performing corresponding operations of the user plane according to the control result of the radio access network controller 10.

As can be seen above, this embodiment implements the control plane functions of L2 and L3s in the radio access network through the radio access network controller, implements the user plane functions of L2 and L3s in the radio access network through the enhanced base station, implements separation of the control plane and the user plane, and improves performance of the whole network.

Figure 2A:
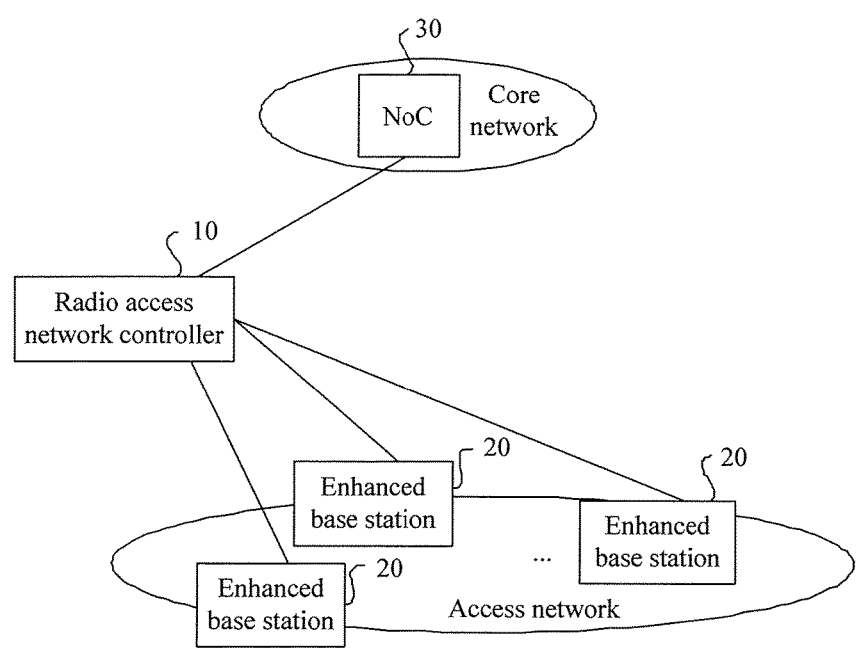
FIG. 2A is a schematic structural diagram of a system for processing air interface information according to another embodiment of the present invention.

FIG. 2A is a schematic structural diagram of a system for processing air interface information according to another embodiment of the present invention. This embodiment is implemented based on the embodiment shown in FIG. 1A. As shown in FIG. 2A, the system for processing air interface information in this embodiment further includes: a network controller (Network Controller, NoC) 30.

The NoC 30 is configured to generate a user plane data forwarding policy of an IP layer and layers above the IP layer, and send the data forwarding policy to the enhanced base station 20. Based on this, the enhanced base station 20 is further configured to receive the data forwarding policy sent by the NoC 30, and process user plane data of the IP layer and the layers above the IP layer according to the data forwarding policy. The processing user plane data of the IP layer and the layers above the IP layer includes but is not limited to: transmitting and receiving the user plane data of the IP layer and the layers above the IP layer.

The NoC 30 is located in a core network, is a main control plane network element of the core network, and is mainly responsible for defining a user plane data forwarding policy. Specifically, the NoC 30 may generate a user plane data forwarding policy of the IP layer and the layers above the IP layer according to information such as the network status information and/or user information, and provide the data forwarding policy to the enhanced base station 20 so that the enhanced base station 20 in the access network routes user plane data of the IP layer and the layers above the IP layer according to the data forwarding policy. The data forwarding policy includes information such as to whom the enhanced base station 20 forwards the user plane data, or through whom the user plane data is forwarded, or from whom the user plane data is received. In addition, the NoC 30 may perform end-to-end bearer management in addition to the function of defining a data forwarding policy, for example, the NoC 30 may process various requests sent by the radio access network controller 10 in the access network, for example, a bearer setup request, and so on. The above user status information includes whether the user moves or is handed over, from which enhanced base station 20 and to which base station the user is handed over, whether the user initiates a new session, and so on; the network status information includes information indicating that usage of resources of an enhanced base station 20 is saturated and cannot accept a new service any longer, and so on.

The interface between the NoC 30 and the enhanced base station 20 is referred to as a C2 interface, but is not limited to the C2 interface name. The C2 interface mainly bears the control plane signaling of the IP layer and the layers above the IP layer (namely, a data forwarding policy), that is, through the C2 interface, the enhanced base station 20 receives the user plane data forwarding policy of the IP layer and the layers above the IP layer which is sent by the NoC 30, and routes data according to the data forwarding policy. Herein the data mainly refers to data of the IP layer and the layers above the IP layer. Optionally, the NoC 30 may control and manage the enhanced base station 20 through an open flow (OpenFlow, OF for short) protocol. Therefore, from the perspective of the C2 interface, the relationship between the NoC 30 and the enhanced base station 20 is similar to the relationship between an OF controller (OF controller) and an OF switch (OF Switch). Therefore, it is understandable that the C2 interface is based on the OF protocol. The following describes the OF protocol in detail.

The OF is a switching technology, and the OF network architecture mainly includes: an OF switch and an OF controller. The OF switch is a core component of the whole OF network, and mainly manages forwarding of the data layer. Each OF switch has a flow table (flow table), for packet lookup and forwarding. The OF switch may be connected to an external controller via a secure channel through the OF protocol, and look up and manage the flow table. The OF switch first looks up the local flow table for the forwarding destination port after receiving a data packet; if no forwarding destination port is matched, the OF switch forwards the data packet to the OF controller, and the control layer decides the forwarding port. The OF controller implements the function of the control layer; the OF controller controls the flow table in the OF switch through the standard interface in the OF protocol, thereby implementing centralized control for the whole network.

The flow table of the OF is formed by multiple flow entries, where each flow entry is a forwarding rule. For a data packet that enters the OF switch, a forwarding destination port is obtained by looking up the flow table. Each flow entry in the flow table of the OF supports three parts: rule, operation, and status. The rule is used to define a flow. The flow in the OF protocol is defined very broadly, and supports 10 fields. In addition to the conventional 7-tuple, a switch port, an Ethernet type, and a VLAN ID are added; the header fields are a 10-tuple, used as an identifier of the flow entry. The operation refers to behaviors such as forwarding and discarding, and indicates an operation that needs to be executed for the data packet matched with the flow entry. The status part is mainly used to generate statistic data of traffic.

Based on the above, the key feature of the OF protocol is to support remote control. Assuming that a user wants to change the flow entry, the user must go to the OF switch for reprogramming; this is troublesome, and the efficiency is low. However, convenience and efficiency may be improved through remote control. Therefore, remote control becomes a feature of the OF. With the OF protocol, the user may define some special rules in the normally running network, and allow traffic compliant with the rules to pass through any path according to requirements, as if a physical network is divided into several different virtual networks, which run simultaneously but do not interfere with each other. In this sense, the OF protocol reconstructs the conventional physical fixed hardware Internet into a dynamic changeable software-defined Internet. A software-defined controllable Internet, is not only more flexible, but also undoubtedly greatly improves robustness, running efficiency, and security of the network through a proper control algorithm.

Based on the advantages of the OF protocol, the NoC 30 in this embodiment may use the OF protocol to manage the enhanced base station 20, which also has advantages of flexibility, convenience, high running efficiency, and so on. Of course, if a protocol similar to the OF or a protocol that is superior to the OF is developed in the future, the NoC 30 may also use the protocol to manage the enhanced base station 20. Optionally, the radio access network controller 10 may also adopt the flow table form control similar to the OF protocol to manage the enhanced base station 20, where the radio access network controller 10 and enhanced base station 20 are respectively equivalent to the OF controller and OF switch in the OF network.

In the actual deployment, the NoC 30 and radio access network controller 10 may be deployed separately, or may also be deployed together. During separate deployment, to implement end-to-end bearer management on the NoC 30, the NoC 30 needs to interact with the radio access network controller 10 through a C3 interface. The interface between the NoC 30 and the radio access network controller 10 is referred to as a C3 interface, but is not limited to the C3 interface name. The C3 interface is mainly used to bear air interface control information reported by the radio access network controller 10 to the NoC 30, and end-to-end control information sent by the NoC 30 to the radio access network controller 10.

In an optional implementation manner of this embodiment, the NoC 30 also stores user service information, user status information, and/or user identifier information. The NoC 30 may actively trigger some control for the access network according to the change of the information, and affect the control performed by the radio access network controller 10 in the access network for the air interface of the enhanced base station 20, so as to indirectly control the air interface. Specifically, the NoC 30 is further configured to send user information to the radio access network controller 10, so that the radio access network controller 10 generates an air interface control policy according to the user information. Correspondingly, the radio access network controller 10 is specifically configured to receive user information sent by the NoC 30, and generate an air interface control policy according to the user information. The user information includes user service information, user status information, and/or user identifier information, and so on. The user status information includes whether the user is in the active or idle state currently, and the user service information includes user subscription information, user QoS information, and so on. For example, if the user service information sent by the NoC 30 to the radio access network controller 10 indicates that the user initiates or receives a new service, the radio access network controller 10 makes a decision: allocating radio resources to the new service of the user, and indicating which enhanced base station(s) 20 forwards data packets related to the new service (namely, an air interface control policy). For another example, if the user status information sent by the NoC 30 to the radio access network controller 10 indicates that the user in the currently idle (idle) state is in the coverage of one or some enhanced base stations 20, the radio access network controller 10 may decide which enhanced base station 20 initiates a paging operation (namely, an air interface control policy).

Figure 2B:
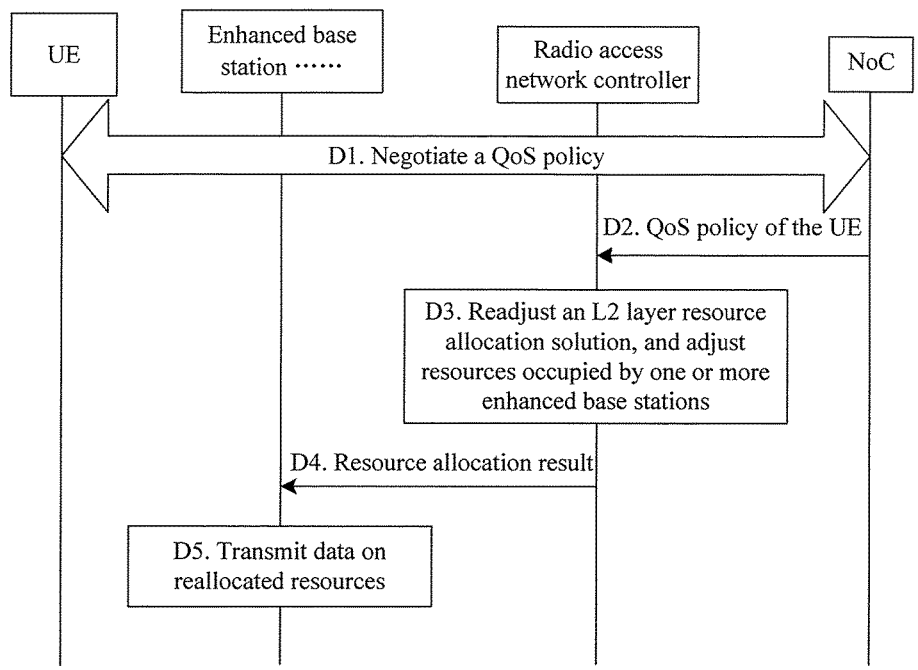
FIG. 2B is an exemplary flowchart of triggering, by an NoC through a C3 interface, a radio access network controller to control an enhanced base station at radio L2 and L3s according to another embodiment of the present invention.

The following uses an example to describe how the NoC 30 triggers, through a C3 interface, the radio access network controller 10 to control the enhanced base station 20 at the radio L2 and L3s. In this example, the NoC 30 stores information related to the user service, for example, QoS information; after the NoC 30 sends the QoS information to the radio access network controller 10, for the purpose of improving usage of system resources or satisfying QoS requirements of the user, the radio access network controller 10 readjusts a resource allocation solution, adjusts resources occupied by one or more enhanced base stations 20, and feeds back the resource allocation result to the one or more enhanced base stations 20, which will transmit data on the reallocated resources according to the received resource allocation result. As shown in FIG. 2B, the specific procedure includes:

Step D1: A UE negotiates a QoS policy with a NoC 30 during network access, where the NoC 30 stores QoS information of the UE, or the NoC 30 obtains the QoS information of the UE from the UE or an application server.

Step D2: The NoC 30 sends the QoS information of the UE to a radio access network controller 10 through a C3 interface.

Step D3: After receiving the QoS information sent by the NoC 30, for the purpose of improving usage of system resources or satisfying QoS requirements of the user, the radio access network controller 10 readjusts an L2 resource allocation solution, and adjusts resources occupied by one or more enhanced base stations 20. Herein the resources maybe channels, times lots, scheduling priori ties, and so on. The reason why one or more enhanced base stations 20 may be adjusted is that one radio access network controller 10 may control multiple enhanced base stations 20. To satisfy requirements, the radio access network controller 10 may adjust the resource allocation solution of more than one enhanced base station 20 simultaneously. An ellipsis is used in FIG. 2B to indicate multiple enhanced base stations 20.

Step D4: The radio access network controller 10 sends the resource allocation result to the one or more enhanced base stations 20.

Step D5: The one or more enhanced base stations 20 transmit data on the reallocated resources after receiving the resource allocation result.

In addition to the above procedure for triggering, by the NoC 30 according to the QoS information, the radio access network controller 10 to reallocate resources, the NoC 30 may also trigger, by sending other information such as service information of the user and network topology information, the radio access network controller 10 to control other operations of the enhanced base station 20 at the air interface, where the specific procedure is similar to the above procedure and is not further described herein.

In an optional implementation manner of this embodiment, the radio access network controller 10 may be further configured to send network status information and/or user status information to the NoC 30, so that the NoC 30 generates a user plane data forwarding policy of the IP layer and the layers above the IP layer according to the network status information and/or user status information. Optionally, the NoC 30 may also locally store network status information and/or user status information beforehand besides receiving the network status information and/or user data information reported by the radio access network controller 10. The network status information includes network topology information, UE information, and so on.

Figure 2C:
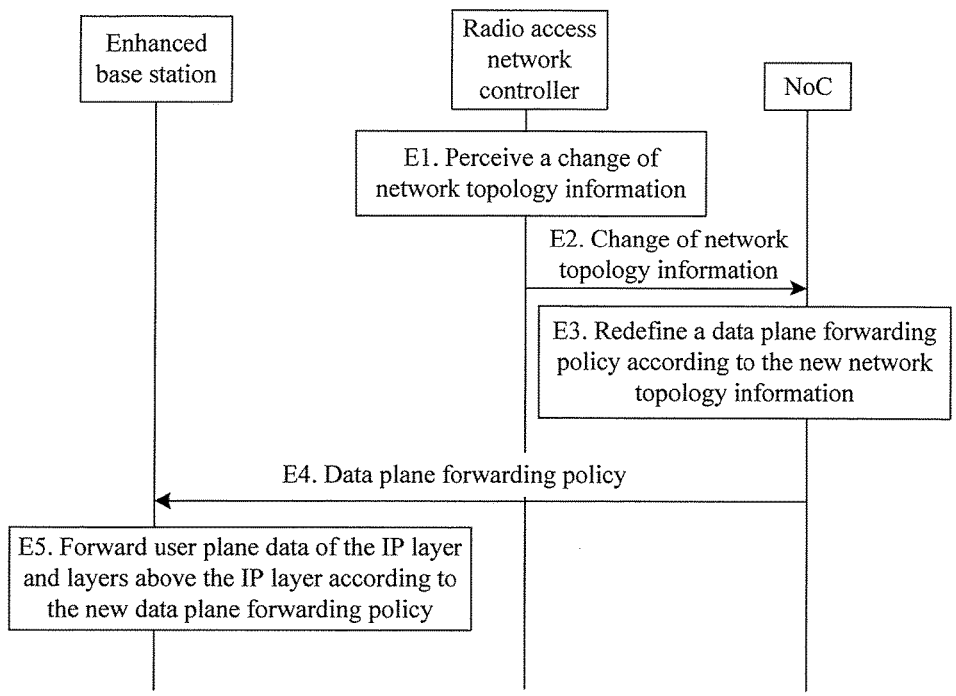
FIG. 2C is an exemplary flowchart of triggering, by a radio access network controller through a C3 interface, an NoC to control forwarding of user plane data of an IP layer and layers above the IP layer of an enhanced base station according to another embodiment of the present invention.

The following uses an example to describe how the radio access network controller 10 triggers, through a C3 interface, the NoC 30 to control forwarding of user plane data of the IP layer and the layers above the IP layer of the enhanced base station 20. The radio access network controller 10 knows a change of network topology information in the access network, and reports the change of network topology information to the NoC 30; the NoC 30 adjusts the user plane forwarding policy correspondingly, and sends the adjusted user plane forwarding policy to the enhanced base station 20; the enhanced base station 20 forwards user plane data of the IP layer and the layers above the IP layer according to the new user plane forwarding policy. As shown in FIG. 2C, the specific procedure includes:

Step E1: The radio access network controller 10 perceives a change of network topology information. The change may be perceived by the radio access network controller 10 itself, or may also be notified by other network elements (such as an enhanced base station 20) to the radio access network controller 10.

Step E2: The radio access network controller 10 notifies the change of network topology information to the NoC 30 through the C3 interface.

Step E3: The NoC 30 redefines, after receiving the change information of the network topology sent by the radio access network controller 10, a user plane forwarding policy according to the new network topology information. Herein the user plane forwarding policy is mainly used for user plane data of the IP layer and the layers above the IP layer; the policy includes information such as which enhanced base stations 20 forward which data.

Step E4: The NoC 30 sends the new user plane forwarding policy to the corresponding enhanced base station 20 through the C2 interface.

Step E5: After receiving the new user plane forwarding policy, the enhanced base station 20 forwards user plane data of the IP layer and the layers above the IP layer according to the new user plane forwarding policy.

Figure 2D:
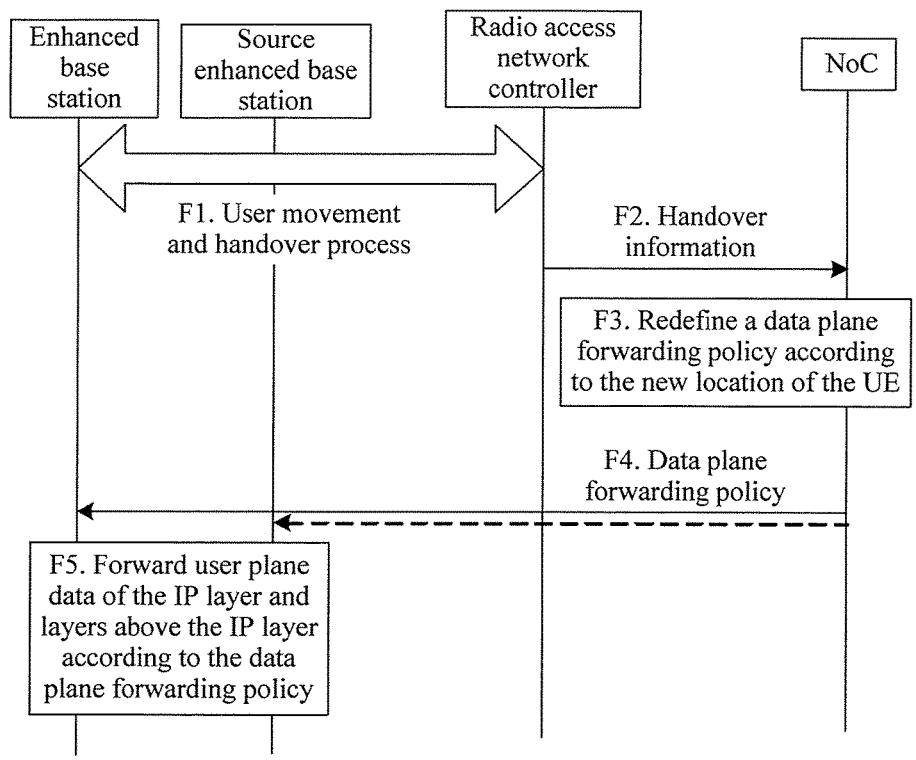
FIG. 2D is another exemplary flowchart of triggering, by a radio access network controller through a C3 interface, an NoC to control forwarding of user plane data of an IP layer and layers above the IP layer of an enhanced base station according to another embodiment of the present invention.

In addition to the above procedure for triggering, by the radio access network controller 10 according to the change of network topology information, the NoC 30 to redefine and send a user plane forwarding policy, the radio access network controller 10 may also trigger, according to other information such as user mobility information, the NoC 30 to redefine and send a user plane forwarding policy, where the specific implementation procedure is shown in FIG. 2D.

Step F1: The enhanced base station perceives that the user moves and is handed over from the source enhanced base station to the enhanced base station (namely, the destination enhanced base station), and a user movement and handover process is performed between the enhanced base station, the source enhanced base station, and the radio access network controller, where the handover process is based on the prior art and not further described herein.

Step F2: The radio access network controller sends handover information to the NoC, where the handover information includes an identifier of the source enhanced base station and an identifier of the enhanced base station. Herein the identifier may be, for example, an IP address, and so on, so that the NoC can perform identification.

Step F3: After receiving the handover information, the NoC redefines, according to the new location of the UE, a data plane forwarding policy of the user plane of the IP layer and the layers above the IP layer for the enhanced base station, for processing user plane data of the IP layer and the layers above the IP layer. For example, the data plane forwarding policy includes information such as which enhanced base stations forward which user plane data. In this embodiment, the data plane forwarding policy mainly includes information which instructs the enhanced base station to forward user plane data of the UE and the source enhanced base station to stop forwarding the user plane data of the UE.

Step F4: The NoC sends the data plane forwarding policy to the corresponding enhanced base station through the C2 interface (namely, at least one of the source enhanced base station and destination enhanced base station; if the data plane forwarding policy is sent to only one of the enhanced base stations, there may be a subsequent process of forwarding, by the base station receiving the forwarding policy, the forwarding policy to another base station).

Step F5: The enhanced base station and/or source enhanced base station forwards user plane data of the IP layer and the layers above the IP layer according to the data plane forwarding policy.

As can be seen above, the radio access network controller of this embodiment is further configured to send handover information to the network controller; where the handover information is sent after the radio access network controller discovers that the UE is handed over from the source enhanced base station to the enhanced base station, and the handover information includes an identifier of the source enhanced base station and an identifier of the enhanced base station after the handover. Correspondingly, the network controller is specifically configured to generate a data forwarding policy after receiving the handover information.

Herein it is noted that the above procedure for triggering, by the NoC 30 through the C3 interface, the radio access network controller 10 to control the enhanced base station 20 at the radio L2 and L3s, and the above procedure for triggering, by the radio access network controller 10 through the C3 interface, the NoC 30 to control forwarding of the user plane data of the IP layer and the layers above the IP layer of the enhanced base station 20 may be performed simultaneously, thereby completely constituting the function of implementing the architecture of separation of the control plane and the user plane by cooperation between the NoC 30, the radio access network controller 10, and the enhanced base station 20, and the interfaces between them in this embodiment.

As can be seen above, in this embodiment, three functional entities and interfaces between the entities cooperate to implement separation of the control plane and the user plane of the radio access network; the control plane includes two layers, namely, a core network (the IP layer and the layers above the IP layer) and an air interface (radio L2 and L3s). The main control network element NoC 30 of the core network layer is configured to define and send the user plane data forwarding policy of the IP layer and the layers above the IP layer; the main control network element of the air interface, namely, the radio access network controller 10, mainly defines and sends the air interface control policy of the air interface (namely, radio L2 and L3s); in the actual deployment, the control network elements of the two layers may be integrated or may be deployed separately; when they are deployed separately, the control signaling borne over the interface between two network elements may be used to implement mutual control between the two network elements. The main network element enhanced base station of the user plane is controlled by the radio access network controller on the air interface, and is controlled and managed by the NoC at the IP layer and the layers above the IP layer, and completes processing of the air interface user plane data and user plane data of the IP layer and the layers above the IP layer.

Figure 3:
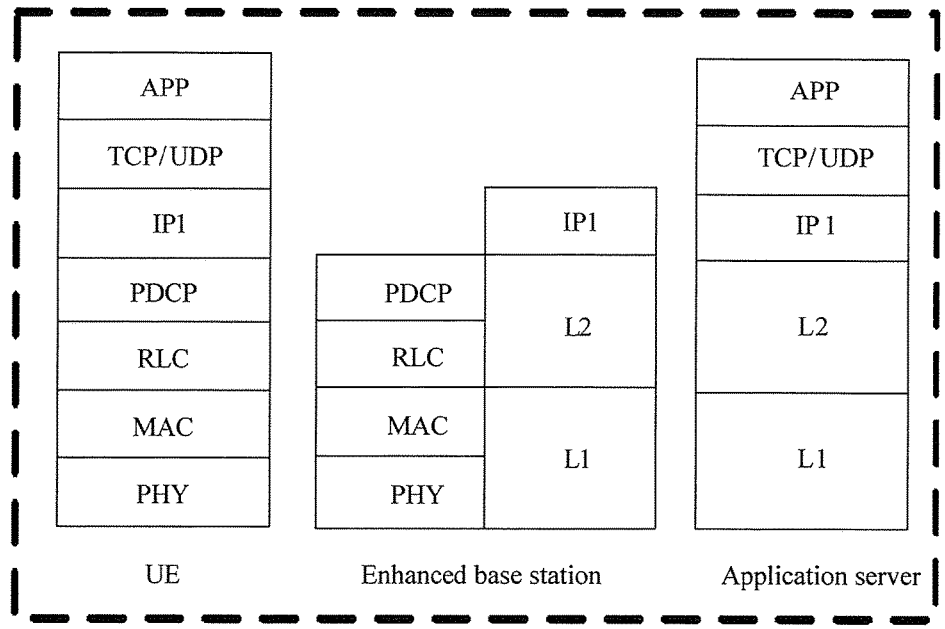
FIG. 3 to FIG. 5 are schematic diagrams of user plane and control plane protocol stacks of network elements in a system for processing air interface information according to an embodiment of the present invention.
Figure 4:
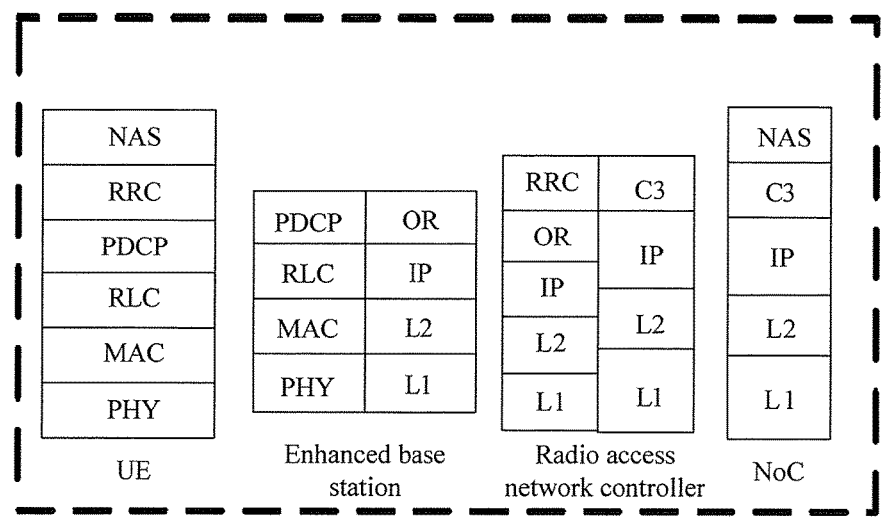
Figure 5:
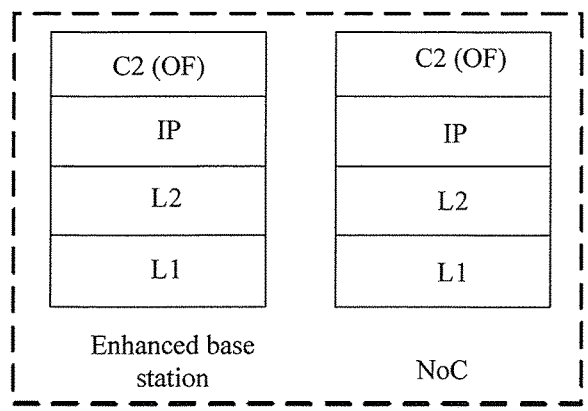

Based on the above, the user plane protocol stack of each network element in this embodiment is shown in FIG. 3. The user plane protocol stack of the enhanced base station 20 mainly includes a user plane protocol stack orientated to a UE and a user plane protocol stack orientated to an application server (APP Server). The user plane protocol stack of the enhanced base station 20, which is orientated to the UE, includes the following layers from the bottom up: PHY, MAC, RLC, and PDCP layers; and the user plane protocol stack orientated to the application server includes the following layers from the bottom up: L1, L2, and IP1 layers. The user plane protocol stack of the UE includes the following layers from the bottom up: PHY, MAC, RLC, PDCP, IP1, TCP/UDP, and APP layers. The user plane protocol stack of the application server includes the following layers from the bottom up: L1, L2, IP1, TCP/UDP, and APP layers. As shown in the protocol stack in FIG. 3, the enhanced base station 20 may receive, under control of the NoC 30, user plane data from the application server, and meanwhile, the enhanced base station 20 may further receive, under control of the radio access network controller 10, user plane data from the UE. The control plane protocol stack of each network element in this embodiment is shown in FIG. 4, and is not further described herein. The control plane protocol stack between the enhanced base station 20 and the NoC 30 is shown in FIG. 5, and is also not further described herein. It should be noted that the IP1, L2, and L1 in FIG. 3 respectively represent an IP layer (which may also be referred to as a network layer, Network layer), layer 2 (which may also be referred to as a data link layer, Data link layer), and layer 1 (which may also be referred to as a physical layer, Physical layer) in the International Organization for Standardization (International Organization for Standardization, ISO for short) layer 7 protocol stack, instead of the foregoing radio L1 and L2s; in FIG. 4, the OR represents an Open Radio interface layer, and C3 represents a C3 interface layer; the C2 in FIG. 5 represents a C2 interface layer.

In an optional implementation manner of this embodiment, the system for processing air interface information in this embodiment includes at least two enhanced base stations 20. Therefore, the radio access network controller 10 is further configured to perform joint processing for physical layer functions of the at least two enhanced base stations 20. Herein the physical layer function is the function of the radio L1, for example, encoding and decoding, modulation and demodulation, mapping of multiple antennas, other typical physical layer functions, and so on. In the present invention, the process of performing joint processing for L1 functions of two or more enhanced base stations 20 is referred to as joint processing (Joint Processing, JP for short). Because joint calculation has a high requirement for resources, the joint processing function is deployed in the radio access network controller instead of each enhanced base station 20. The centralized deployment mode may implement high efficiency usage of resources, and may further reduce mutual transmission between enhanced base stations 20. The radio access network controller 10 may adopt the existing algorithm to perform joint processing for the physical layer function of each enhanced base station 20, where the specific process is not further described herein.

Figure 6:
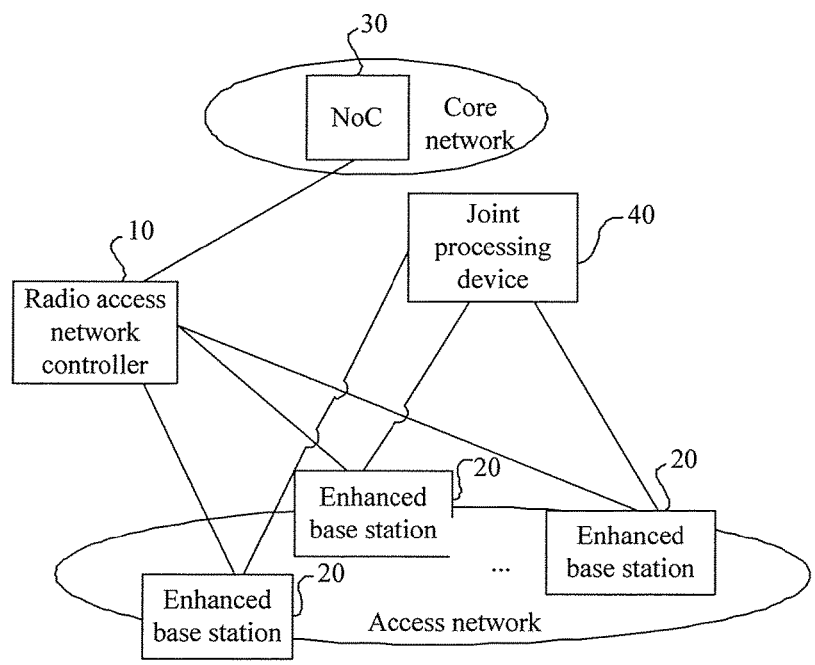
FIG. 6 is a schematic structural diagram of a system for processing air interface information according to another embodiment of the present invention.

In an optional implementation manner of this embodiment, as shown in FIG. 6, the system for processing air interface information in this embodiment further includes a joint processing device 40. The joint processing device 40 is connected to each enhanced base station 20, and is configured to perform joint processing for physical layer functions of at least two enhanced base stations 20. The joint processing device 40 may also adopt the existing algorithm to perform joint processing for the physical layer function of each enhanced base station 20, where the specific process is not further described herein. Herein it is noted that the joint processing device 40 is independent of the radio access network controller 10.

As can be seen above, the functional entity that performs joint processing for the physical layer function of each enhanced base station 20 and the radio access network controller 10 may be located in a same physical network element, that is, the joint processing may be executed by the radio access network controller 10, and may also be located in different physical network elements.

Figure 7:
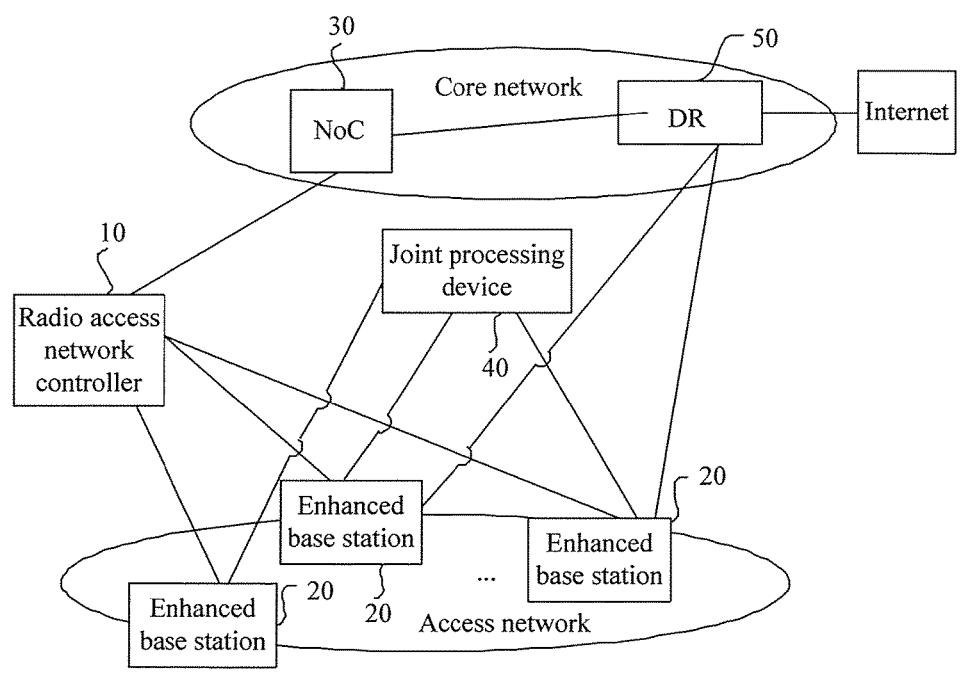
FIG. 7 is a schematic structural diagram of a system for processing air interface information according to another embodiment of the present invention.

In an optional implementation manner of this embodiment, as shown in FIG. 7, the system for processing air interface information in this embodiment further includes a Domain Router (DR) 50. The DR 50 is configured to receive the data forwarding policy sent by the NoC 30, and process user plane data of the IP layer and the layers above the IP layer according to the data forwarding policy. Herein the processing user plane data of the IP layer and the layers above the IP layer also includes but is not limited to: transmitting and receiving the user plane data of the IP layer and the layers above the IP layer. Optionally, the DR 50 is further configured to allocate an IP address to the UE, send the allocated IP address to the UE, and report the allocated IP address to the NoC 30. Optionally, the DR 50 may further report information such as the identifier of the UE to the NoC 30. The NoC 30 receives the information reported by the DR 50 such as the allocated IP address and the identifier of the UE, which helps to define a data forwarding policy based on the information.

Specifically, the DR 50 in this embodiment has a function of processing user planes of the IP layer and the layers above the IP layer, and has an interface with the Internet. The DR 50 is located at a domain edge, may be located in a core network or an access network (located in the core network in FIG. 7), and is responsible for performing data transmitting and receiving according to the data forwarding policy sent by the NoC 30, and may further participate in processing procedures such as bearer setup and handover. In addition, the DR 50 may be responsible for managing, maintaining, allocating, and sending IP addresses, and so on. Different access standards may be connected to different DRs 50, where the DRs 50 are interconnected to implement interworking. Preferably, the DR 50 is deployed at a network layer unrelated to the location.

The NoC 30 and the DR 50 are connected through a C1 interface, where the interface between the NoC 30 and the DR 50 is referred to as a C1 interface. The C1 interface may be used to transmit various control policies that are sent to the DR 50 by the NoC 30, where the control performed by the NoC 30 for the DR 50 mainly includes controlling routing and forwarding of the DR 50 by sending a data forwarding policy, and further includes UE handover control, and so on. Optionally, the NoC 30 may use the OF protocol to control the DR 50. Therefore, from the perspective of the C1 interface, the relationship between the NoC 30 and the DR 50 is similar to the relationship between the OF controller and the OF switch in the OF protocol. The C1 interface may be implemented by using an interface in the OF protocol, but is not limited thereto.

Optionally, the DR 50 may be further connected to the enhanced base station 20, and used to forward user plane data of the IP layer and the layers above the IP layer between each other, and implement the user plane function in the whole network through cooperation of the DR 50 and enhanced base station 20. The interface between the DR 50 and the enhanced base station 20 is an IP-based interface, and mainly transmits user plane data of the IP layer and the layers above the IP layer.

Herein it is noted that in the system shown in FIG. 7, the joint processing device 40 is an optional network element.

The system for processing air interface information, which is formed by the above functional entities and interfaces, implements separation of the control plane and the user plane of the radio access network, thereby incorporating the access network into the management scope and improving performance of the whole network.

Figure 8:
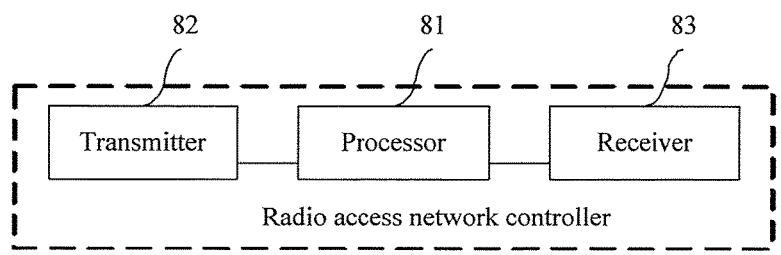
FIG. 8 is a schematic structural diagram of a radio access network controller according to an embodiment of the present invention.

FIG. 8 is a schematic structural diagram of a radio access network controller according to an embodiment of the present invention. The radio access network controller in this embodiment has air interface control functions of a radio access network; as shown in FIG. 8, the radio access network controller in this embodiment includes a processor 81 and a transmitter 82.

The processor 81 is configured to generate an air interface control policy. The transmitter 82 is connected to the processor 81, and configured to send the air interface control policy generated by the processor 81 to an enhanced base station through an open interface, so that the enhanced base station processes air interface user plane data according to the air interface control policy. The open interface is an interface between the radio access network controller and the enhanced base station of this embodiment, so that the enhanced base station implements, under control of the radio access network controller of this embodiment, the air interface user plane function of the radio access network. Compared with the prior art, the enhanced base station opens, through the open interface, the air interface control function of the radio access network which is originally implemented by the enhanced base station to the radio access network controller of this embodiment.

The radio access network controller of this embodiment may be specifically a control plane network element in the radio access network. The control plane network element is not further described herein. For details, reference may be made to the description in the embodiment of the system for processing air interface information.

In an optional implementation manner of this embodiment, the radio access network controller further includes a receiver 83. The receiver 83 is configured to receive user information sent by an NoC in a core network, and provide user information to the processor 81. The processor 81 is further connected to the receiver 83, and is configured to generate an air interface control policy according to the user information received by the receiver 83. The user information includes user service information, user status information, and/or user identifier information, and so on. The user status information includes whether the user moves or is handed over, and from which enhanced base station 20 and to which base station the user is handed over, and the user service information includes whether the user initiates a new session, user QoS information, and so on.

In an optional implementation manner of this embodiment, the transmitter 82 is further configured to send network status information and/or user status information to the NoC in the core network, so that the NoC defines a user plane data forwarding policy of the IP layer and the layers above the IP layer according to the network status information and/or user status information. The data forwarding policy is used by the enhanced base station to process user plane data of the IP layer and the layers above the IP layer.

In an optional implementation manner of this embodiment, the transmitter 82 is further configured to send handover information to the NoC in the core network, so that the NoC redefines the user plane data forwarding policy of the IP layer and the layers above the IP layer for the enhanced base station, for processing user plane data of the IP layer and the layers above the IP layer, and sends the redefined user plane data forwarding policy of the IP layer and the layers above the IP layer to at least one of the source enhanced base station before the handover and the destination enhanced base station after the handover; if the user plane data forwarding policy is sent to only one of the enhanced base stations, there may be a subsequent process of forwarding, by the base station receiving the forwarding policy, the forwarding policy to another base station. The handover information is sent after the radio access network controller discovers that a UE is handed over from the source enhanced base station to the enhanced base station, and the handover information includes an identifier of the source enhanced base station and an identifier of the enhanced base station.

The air interface control corresponding to the air interface control policy of this embodiment includes any one or any combination of the following: radio resource allocation, uplink/downlink scheduling, scheduling priority selection, HARQ retransmission, RLC connection control and management, protocol error detection and recovery, control plane protocol encryption and decryption, broadcast, paging, RRC connection management, radio bearer management, mobility management, key management, UE measurement reporting and control, MBMS control, NAS message direct transfer, and QoS management.

In an optional implementation manner of the embodiment, there are at least two enhanced base stations in the network. Based on this, the transmitter 82 of this embodiment is specifically configured to send the air interface control policy to at least two enhanced base stations through the open interface. Correspondingly, the processor of this embodiment is further configured to perform joint optimization processing for physical layer functions of the at least two enhanced base stations.

In an optional implementation manner of this embodiment, the receiver 83 is further configured to receive, before the processor 81 generates an air interface control policy, an air interface policy request that is sent by the enhanced base station and is used to request an air interface control policy, and send the air interface policy request to the processor 81, so that the processor 81 generates an air interface control policy for the enhanced base station according to the air interface policy request.

For example, the air interface policy request is an exception processing request; correspondingly, the air interface control policy is a joint processing policy or a cell migration policy. Therefore, the receiver 83 is specifically configured to receive, through the open interface, an exception processing request sent by the enhanced base station, where the exception processing request includes a neighboring cell measurement result reported by the UE. The processor 81 is specifically configured to perform processing and make a decision, and generate a joint processing policy or a cell migration policy according to the neighboring cell measurement result and provide it to the transmitter 82. The transmitter 82 is specifically configured to send the joint processing policy or the cell migration policy to the enhanced base station through the open interface.

For example, the air interface control is radio resource allocation; correspondingly, the air interface policy request is a radio resource allocation request, and the air interface control policy is a radio resource allocation result. Therefore, the receiver 83 is further configured to receive, through the open interface, the radio resource allocation request sent by the enhanced base station and provide it to the processor 81. The radio resource allocation request is sent by the enhanced base station when a new user accesses the enhanced base station. The processor 81 is configured to allocate resources according to the radio resource allocation request received by the receiver 83, generate a radio resource allocation result, and provide the radio resource allocation result to the transmitter 82. The transmitter 82 is specifically configured to send the radio resource allocation result to the enhanced base station through the open interface. Optionally, the transmitter 82 is specifically configured to send a radio resource allocation response message to the enhanced base station through the open interface. The radio resource allocation response message carries a radio resource allocation result.

In this embodiment, the interface between the radio access network controller and the enhanced base station is referred to as an Open Radio interface, and the interface between the radio access network controller and the NoC is referred to as a C2 interface. The interface is not further described herein. For details, reference may be made to the embodiment of the system for processing air interface information.

In this embodiment, the radio access network controller and enhanced base station cooperate with each other to implement the control plane function at the air interface of the radio access network; while the enhanced base station implements the user plane function, so that the control plane and the user plane of the radio access network are separated. Therefore, the access network is incorporated into the management scope, and overall network performance is improved.

Figure 9:
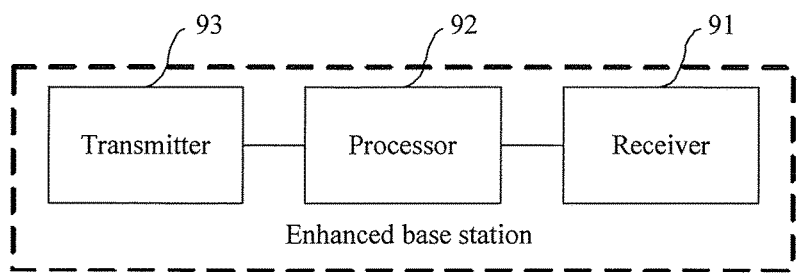
FIG. 9 is a schematic structural diagram of an enhanced base station according to an embodiment of the present invention.

FIG. 9 is a schematic structural diagram of an enhanced base station according to an embodiment of the present invention. As shown in FIG. 9, the enhanced base station of this embodiment includes a receiver 91 and a processor 92.

The receiver 91 is configured to receive, through an open interface, an air interface control policy sent by a radio access network controller having an air interface control function of a radio access network. The processor 92 is connected to the receiver 91, and configured to process air interface user plane data according to the air interface control policy. The open interface is an interface between the enhanced base station and the radio access network controller of this embodiment, so that the enhanced base station of this embodiment implements, under control of the radio access network controller, the air interface user plane function of the radio access network. Compared with the prior art, the enhanced base station of this embodiment opens, through the open interface with the radio access network, the air interface control function of the radio access network which is originally implemented by the enhanced base station to the radio access network controller.

The enhanced base station of this embodiment maybe specifically a user plane network element in the radio access network. The user plane network element is not further described herein. For details, reference may be made to the description in the embodiment of the system for processing air interface information.

In an optional implementation manner of this embodiment, the receiver 91 is further configured to receive a user plane data forwarding policy of the IP layer and the layers above the IP layer which is sent by the NoC in the core network. Correspondingly, the processor 92 is further configured to process user plane data of the IP layer and the layers above the IP layer according to the data forwarding policy received by the receiver 91.

The air interface control corresponding to the air interface control policy of this embodiment includes any one or any combination of the following: radio resource allocation, uplink/downlink scheduling, scheduling priority selection, HARQ retransmission, RLC connection control and management, protocol error detection and recovery, control plane protocol encryption and decryption, broadcast, paging, RRC connection management, radio bearer management, mobility management, key management, UE measurement reporting and control, MBMS control, NAS message direct transfer, and QoS management.

In an optional implementation manner of this embodiment, the enhanced base station of this embodiment further includes a transmitter 93. The transmitter 93 is configured to send an air interface policy request to the radio access network controller through the open interface, so as to request the air interface control policy from the radio access network controller, so that the radio access network controller generates, according to the request, an air interface control policy for the enhanced base station of this embodiment, and sends the air interface control policy.

For example, the air interface control is radio resource allocation. Therefore, the transmitter 93 is specifically configured to send a radio resource allocation request to the radio access network controller through the open interface when a new user accesses the enhanced base station of this embodiment, where the radio resource allocation request received by the radio access network controller is a radio resource allocation result generated by the enhanced base station of this embodiment, and return a radio resource allocation response message. The radio resource allocation request includes a user identifier of the new user. Correspondingly, the receiver 91 is specifically configured to receive, through the open interface, the radio resource allocation result sent by the radio access network controller. Optionally, the receiver 91 is specifically configured to receive, through the open interface, the radio resource allocation response message sent by the radio access network controller. The radio resource allocation response message carries a radio resource allocation result.

For another example, the air interface policy request is an exception processing request; correspondingly, the air interface control policy is a joint processing policy or a cell migration policy. Therefore, the transmitter 93 is further configured to send a neighboring cell measurement request to the UE when a preset trigger condition is met, so that the UE is triggered to perform a process of measuring neighboring cells. The preset trigger condition includes any one or any combination of the following conditions: the quantity of users accessing the enhanced base station of this embodiment is greater than a preset quantity threshold; throughput of edge users covered by the enhanced base station of this embodiment does not meet throughput requirements; and experience of users accessing the enhanced base station of this embodiment breaks a preset experience threshold. The receiver 91 is further configured to receive a neighboring cell measurement result sent by the UE. The transmitter 93 is specifically configured to send the exception processing request to the radio access network controller through the open interface after the receiver 91 receives the neighboring cell measurement result sent by the UE, where the exception processing request includes the neighboring cell measurement result, so that the radio access network controller determines the air interface control policy according to the neighboring cell measurement result. The receiver 91 is specifically configured to receive, through the open interface, the joint processing policy or the cell migration policy sent by the radio access network controller, where the joint processing policy or the cell migration policy is determined by the radio access network controller according to the neighboring cell measurement result.

In this embodiment, the interface between the enhanced base station and the radio access network controller is referred to as an Open Radio interface, and the interface between the enhanced base station and the NoC is referred to as a C3 interface. The interface is not further described herein. For details, reference may be made to the embodiment of the system for processing air interface information.

In this embodiment, the enhanced base station and radio access network controller cooperate with each other to implement the user plane function; while the radio access network controller implements the control plane function at the air interface of the radio access network, so that the control plane and the user plane of the radio access network are separated. Therefore, the access network is incorporated into the management scope, and overall network performance is improved.

Figure 10:
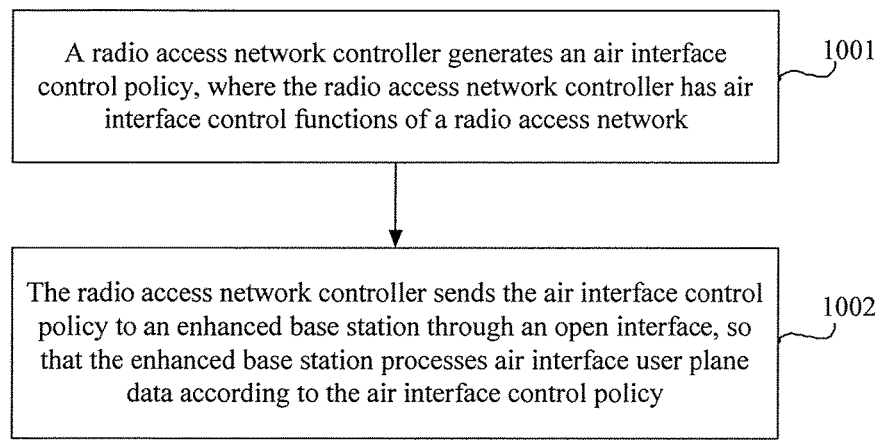
FIG. 10 is a flowchart of a method for processing air interface information according to an embodiment of the present invention.

FIG. 10 is a flowchart of a method for processing air interface information according to an embodiment of the present invention. As shown in FIG. 10, the method in this embodiment includes:

Step 1001: A radio access network controller generates an air interface control policy, where the radio access network controller has air interface control functions of a radio access network.

Step 1002: The radio access network controller sends the air interface control policy to an enhanced base station through an open interface; so that the enhanced base station processes air interface user plane data according to the air interface control policy.

In this embodiment, the open interface is an interface between the radio access network controller and the enhanced base station, so that the enhanced base station implements, under control of the radio access network controller, the air interface user plane function of the radio access network. Compared with the prior art, the enhanced base station opens, through the open interface with the radio access network controller, the air interface control function of the radio access network which is originally implemented by the enhanced base station to the radio access network controller.

In an optional implementation manner of this embodiment, the process of generating an air interface control policy by the radio access network controller includes: receiving, by the radio access network controller, user information sent by the network controller in the core network, where the user information includes user service information, user status information, and/or user identifier information; and generating, by the radio access network controller, the air interface control policy according to the user information, where the user service information includes user QoS information.

The air interface control corresponding to the air interface control policy includes any one or any combination of the following: radio resource allocation, uplink/downlink scheduling, scheduling priority selection, HARQ retransmission, RLC connection control and management, protocol error detection and recovery, control plane protocol encryption and decryption, broadcast, paging, RRC connection management, radio bearer management, mobility management, key management, UE measurement reporting and control, MBMS control, NAS message direct transfer, and QoS management.

In an optional implementation manner of this embodiment, the method for processing air interface information further includes: sending, by the radio access network controller, network status information and/or user status information to the network controller in the core network, so that the network controller defines a user plane data forwarding policy of an IP layer and layers above the IP layer according to the network status information and/or user status information, where the data forwarding policy is used by the enhanced base station to process user plane data of the IP layer and the layers above the IP layer.

In an optional implementation manner of this embodiment, the method for processing air interface information further includes: sending, by the radio access network controller, handover information to the network controller in the core network, so that the network controller redefines the user plane data forwarding policy of the IP layer and the layers above the IP layer for the enhanced base station, for processing user plane data of the IP layer and the layers above the IP layer, and sends the redefined user plane data forwarding policy of the IP layer and the layers above the IP layer to at least one of the source enhanced base station before the handover and the destination enhanced base station (namely, the above enhanced base station) after the handover; if the user plane data forwarding policy is sent to only one of the enhanced base stations, there may be a subsequent process of forwarding, by the base station receiving the forwarding policy, the forwarding policy to another base station. The handover information is sent after the radio access network controller discovers that a UE is handed over from the source enhanced base station to the enhanced base station, and the handover information includes an identifier of the source enhanced base station and an identifier of the enhanced base station.

In an optional implementation manner of this embodiment, the number of the enhanced base stations is at least two. Therefore, the method for processing air interface information further includes: performing joint optimization processing for physical layer functions of the at least two enhanced base stations.

In an optional implementation manner of this embodiment, before the radio access network controller generates an air interface control policy, the method includes: receiving, by the radio access network controller through the open interface, an air interface policy request that is sent by the enhanced base station and is used to request the air interface control policy; and then generating an air interface control policy according to the air interface policy request.

In an optional implementation manner of this embodiment, the air interface policy request is an exception processing request that includes a neighboring cell measurement result reported by the UE; correspondingly, the air interface control policy is a joint processing policy or a cell migration policy. Or the air interface policy request is a radio resource allocation request, and correspondingly, the air interface control policy is a radio resource allocation result.

The specific implementation process of the method for processing air interface information in this embodiment is not further described herein. For details, reference may be made to the description in the above embodiment.

In this embodiment, the radio access network controller is responsible for generating an air interface control policy and sending the air interface control policy to the enhanced base station; the enhanced base station is responsible for processing air interface user plane data according to the air interface control policy, thereby implementing separation of the control plane and the user plane of the radio access network.

Figure 11:
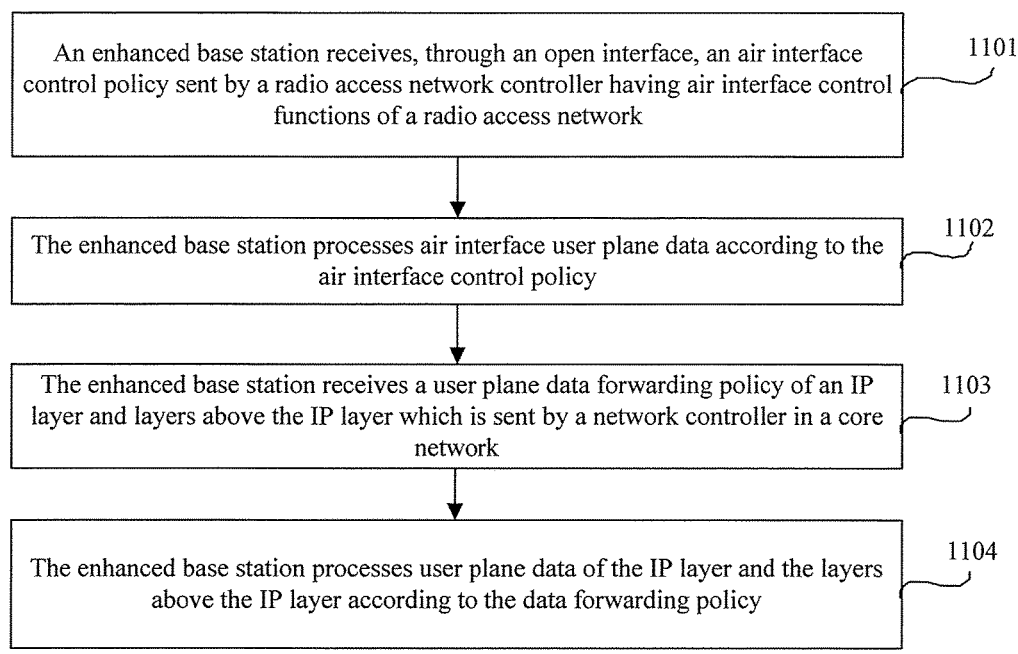
FIG. 11 is a flowchart of a method for processing air interface information according to another embodiment of the present invention.

FIG. 11 is a flowchart of a method for processing air interface information according to another embodiment of the present invention. As shown in FIG. 11, the method for processing air interface information in this embodiment includes:

Step 1101: An enhanced base station receives, through an open interface, an air interface control policy sent by a radio access network controller having an air interface control function of a radio access network.

The open interface is an interface between the enhanced base station and the radio access network controller, so that the enhanced base station implements, under control of the radio access network controller, the air interface user plane function of the radio access network. Compared with the prior art, the enhanced base station of this embodiment opens, through the open interface with the radio access network, the air interface control function of the radio access network which is originally implemented by the enhanced base station to the radio access network controller. The air interface control policy is generated by the radio access network controller.

Step 1102: The enhanced base station processes air interface user plane data according to the air interface control policy.

In an optional implementation manner of this embodiment, the method for processing air interface information of this embodiment further includes:

Step 1103: The enhanced base station receives a user plane data forwarding policy of an IP layer and layers above the IP layer which is sent by a network controller in a core network.

Step 1104: The enhanced base station processes user plane data of the IP layer and the layers above the IP layer according to the data forwarding policy.

The procedure described in steps 1101 and 1102 and the procedure described in steps 1103 and 1104 are not strictly limited by order, and may be executed independently or separately.

In an optional implementation manner of this embodiment, before step 1101, the method for processing air interface information includes: sending, by the enhanced base station, an air interface policy request to the radio access network controller, for requesting the air interface control policy.

In an optional implementation manner of this embodiment, the air interface policy request is an exception processing request that includes a neighboring cell measurement result reported by the UE; correspondingly, the air interface control policy is a joint processing policy or a cell migration policy. Or the air interface policy request is a radio resource allocation request, and correspondingly, the air interface control policy is a radio resource allocation result.

The air interface control corresponding to the air interface control policy includes any one or any combination of the following: radio resource allocation, uplink/downlink scheduling, scheduling priority selection, HARQ retransmission, RLC connection control and management, protocol error detection and recovery, control plane protocol encryption and decryption, broadcast, paging, RRC connection management, radio bearer management, mobility management, key management, UE measurement reporting and control, MBMS control, NAS message direct transfer, and QoS management.

The specific implementation process of the method for processing air interface information in this embodiment is not further described herein. For details, reference may be made to the description in the above embodiment.

In this embodiment, the enhanced base station receives the air interface control policy that is generated and sent by the radio access network controller, and processes the air interface user plane data according to the air interface control policy, thereby implementing separation of the control plane and the user plane of the radio access network.

Persons of ordinary skill in the art may understand that, all or a part of the steps in each of the foregoing method embodiments may be implemented by a program instructing relevant hardware. The aforementioned program may be stored in a computer readable storage medium. When the program runs, the steps of the foregoing method embodiments are performed. The foregoing storage medium includes any medium capable of storing program codes, such as a ROM, a RAM, a magnetic disk, or an optical disk.

Finally, it should be noted that the foregoing embodiments are merely intended for describing the technical solutions of the present invention, rather than limiting the present invention. Although the present invention is described in detail with reference to the foregoing embodiments, persons of ordinary skill in the art should understand that they may still make modifications to the technical solutions described in the foregoing embodiments, or make equivalent replacements to some or all the technical features thereof, as long as such modifications or replacements do not cause the essence of corresponding technical solutions to depart from the scope of the technical solutions of the embodiments of the present invention.

What is claimed is:

1. An enhanced base station, comprising:
   a receiver, configured to receive, through an open interface, an air interface control policy sent by a radio access network controller having an air interface control function of a radio access network, wherein the air interface control policy is generated by the radio access network controller for radio data link layer (L2) and network layer (L3), and the open interface is an interface between the enhanced base station and the radio access network controller; and
   a processor, configured to process air interface user plane data according to the air interface control policy;
   wherein the enhanced base station is configured without any radio (L2) and (L3) control plane functions, and the radio L2 and L3 protocol control plane functions comprise radio resource allocation, uplink/downlink scheduling, scheduling priority selection, protocol error detection and recovery, control plane protocol encryption and decryption, broadcast, paging, Radio Resource Control (RRC) connection management, radio bearer management, mobility management, key management, user equipment (UE) measurement reporting and control, Multimedia Broadcast Multicast Service (MBMS) control, NAS message direct transfer and Quality of Service (QoS) management.

2. The enhanced base station according to claim 1, wherein:
   the receiver is further configured to receive a user plane data forwarding policy of an Internet protocol (IP) layer and layers above the IP layer which is sent by a network controller in a core network; and
   the processor is further configured to process user plane data of the IP layer and the layers above the IP layer according to the data forwarding policy.

3. The enhanced base station according to claim 1, further comprising:
   a transmitter, configured to send an air interface policy request to the radio access network controller through the open interface to request the air interface control policy.

4. The enhanced base station according to claim 3, wherein:
   the air interface policy request is an exception processing request, and the air interface control policy is a joint processing policy or a cell migration policy;
   the transmitter is further configured to send a neighboring cell measurement request to a user equipment (UE) when a preset trigger condition is met, so that the UE is triggered to perform a process of measuring neighboring cells;
   the receiver is further configured to receive a neighboring cell measurement result sent by the UE;
   the transmitter is configured to send the exception processing request to the radio access network controller through the open interface after the receiver receives the neighboring cell measurement result, wherein the exception processing request comprises the neighboring cell measurement result, so that the radio access network controller determines the air interface control policy according to the neighboring cell measurement result; and
   the receiver is configured to receive, through the open interface, the joint processing policy or the cell migration policy sent by the radio access network controller, wherein the joint processing policy or the cell migration policy is determined by the radio access network controller according to the neighboring cell measurement result.

5. The enhanced base station according to claim 4, wherein the preset trigger condition comprises any one or any combination of the following conditions:

a quantity of users accessing the enhanced base station is greater than a preset quantity threshold;
throughput of edge users covered by the enhanced base station does not meet throughput requirements; and
experience of users accessing the enhanced base station breaks a preset experience threshold.

6. The enhanced base station according to claim 3, wherein:
the air interface policy request is a radio resource allocation request, and the air interface control policy is a radio resource allocation result;
the transmitter is configured to send the radio resource allocation request to the radio access network controller through the open interface when a new user accesses the enhanced base station, wherein the radio resource allocation request comprises a user identifier of the new user; and
the receiver is configured to receive, through the open interface, the radio resource allocation result sent by the radio access network controller.

7. The enhanced base station according to claim 1, wherein the open interface is used by the enhanced base station to implement, under control of the radio access network controller, a user plane function at an air interface of the radio access network.

8. A radio access network controller having air interface control functions of a radio access network, the radio access network controller comprising:
a processor, configured to generate an air interface control policy for radio data link layer (L2) and network layer (L3);
a transmitter, configured to send the air interface control policy to an enhanced base station configured without any radio L2 and L3 control plane functions through an open interface, so that the enhanced base station processes air interface user plane data according to the air interface control policy, wherein the radio L2 and L3 protocol control plane functions comprise radio resource allocation, uplink/downlink scheduling, scheduling priority selection, protocol error detection and recovery, control plane protocol encryption and decryption, broadcast, paging, Radio Resource Control (RRC) connection management, radio bearer management, mobility management, key management, user equipment (UE) measurement reporting and control, Multimedia Broadcast Multicast Service (MBMS) control, NAS message direct transfer and Quality of Service (QoS) management; and
wherein the open interface is an interface between the radio access network controller and the enhanced base station.

9. The radio access network controller according to claim 8, further comprising:
a receiver, configured to receive user information sent by a network controller in a core network, wherein the user information comprises user service information, user status information, and/or user identifier information, and wherein the processor is configured to generate the air interface control policy according to the user information.

10. The radio access network controller according to claim 9, wherein the user status information is user quality of service (QoS) information.

11. The radio access network controller according to claim 9, wherein the receiver is further configured to receive, from the enhanced base station through the open interface, an air interface policy request for requesting the air interface control policy.

12. The radio access network controller according to claim 11, wherein:
the air interface policy request is an exception processing request, and the air interface control policy is a joint processing policy or a cell migration policy;
the receiver is configured to receive, through the open interface, the exception processing request sent by the enhanced base station, wherein the exception processing request comprises a neighboring cell measurement result reported by a user equipment (UE);
the processor is configured to generate the joint processing policy or the cell migration policy according to the neighboring cell measurement result; and
the transmitter is configured to send the joint processing policy or the cell migration policy to the enhanced base station through the open interface.

13. The radio access network controller according to claim 11, wherein:
the air interface policy request is a radio resource allocation request, and the air interface control policy is a radio resource allocation result;
the receiver is configured to receive, through the open interface, the radio resource allocation request sent by the enhanced base station, wherein the radio resource allocation request is sent by the enhanced base station when a new user accesses the enhanced base station;
the processor is configured to generate the radio resource allocation result according to the radio resource allocation request; and
the transmitter is configured to send the radio resource allocation result to the enhanced base station through the open interface.

14. The radio access network controller according to claim 8, wherein the transmitter is further configured to send network status information and/or user status information to a network controller in a core network, so that the network controller defines a user plane data forwarding policy of an Internet protocol (IP) layer and layers above the IP layer according to the network status information and/or user status information, wherein the data forwarding policy is used by the enhanced base station to process user plane data of the IP layer and the layers above the IP layer.

15. The radio access network controller according to claim 8, wherein:
the transmitter is further configured to send handover information to the network controller in the core network, to enable the network controller to redefine a user plane data forwarding policy of the IP layer and the layers above the IP layer, and send the redefined user plane data forwarding policy of the IP layer and the layers above the IP layer to at least one of a source enhanced base station before a handover and a destination enhanced base station after the handover; and
the handover information is sent after the radio access network controller discovers that a user equipment (UE) is handed over from the source enhanced base station to the destination enhanced base station, and the handover information comprises an identifier of the source enhanced base station and an identifier of the destination enhanced base station.

16. The radio access network controller according to claim 8, wherein:

the transmitter is configured to send the air interface control policy to at least two enhanced base stations through the open interface; and the processor is further configured to perform joint optimization processing for physical layer functions of the at least two enhanced base stations.

17. The radio access network controller according to claim 8, wherein the open interface is used by the enhanced base station to implement, under control of the radio access network controller, an air interface user plane function of the radio access network.

18. A method for processing air interface information, the method comprising:

generating, by a radio access network controller, an air interface control policy for radio data link layer (L2) and network layer (L3), wherein the radio access network controller has air interface control functions of a radio access network; and;

sending, by the radio access network controller, the air interface control policy to an enhanced base station configured without any radio L2 and L3 control plane functions through an open interface, to enable the enhanced base station to process air interface user plane data for radio L2 and L3 according to the air interface control policy;

wherein the radio L2 and L3 protocol control plane functions comprise radio resource allocation, uplink/downlink scheduling, scheduling priority selection, protocol error detection and recovery, control plane protocol encryption and decryption, broadcast, paging, Radio Resource Control (RRC) connection management, radio bearer management, mobility management, key management, user equipment (UE) measurement reporting and control, Multimedia Broadcast Multicast Service (MBMS) control, NAS message direct transfer and Quality of Service (QoS) management.

19. The method for processing air interface information according to claim 18, wherein generating, by a radio access network controller, an air interface control policy comprises:

receiving, by the radio access network controller, user information sent by a network controller in a core network, wherein the user information comprises user service information, user status information, and/or user identifier information; and generating, by the radio access network controller, the air interface control policy according to the user information.

20. The method for processing air interface information according to claim 19, wherein the user status information is user quality of service (QoS) information.

21. The method for processing air interface information according to claim 18, further comprising:

sending, by the radio access network controller, network status information and/or user status information to a network controller in a core network, so that the network controller defines a user plane data forwarding policy of an Internet protocol (IP) layer and layers above the IP layer according to the network status information and/or user status information, wherein the data forwarding policy is used by the enhanced base station to process user plane data of the IP layer and the layers above the IP layer.

22. The method for processing air interface information according to claim 18, further comprising:

sending, by the radio access network controller, handover information to the network controller in the core network, to enable the network controller to redefine a user plane data forwarding policy of an Internet protocol (IP) layer and layers above the IP layer, and send the redefined user plane data forwarding policy of the IP layer and the layers above the IP layer to at least one of a source enhanced base station before a handover and a destination enhanced base station after the handover, wherein the handover information is sent after the radio access network controller discovers that a user equipment (UE) is handed over from the source enhanced base station to the destination enhanced base station, and the handover information comprises an identifier of the source enhanced base station and an identifier of the destination enhanced base station.

23. The method for processing air interface information according to claim 18, wherein:

the number of the enhanced base stations is at least two; and the method for processing air interface information further comprises:

performing, by the radio access network controller, joint optimization processing for physical layer functions of the at least two enhanced base stations.

24. The method for processing air interface information according to claim 18, wherein before generating, by a radio access network controller, an air interface control policy, the method comprises:

receiving, by the radio access network controller from the enhanced base station through the open interface, an air interface policy request for requesting the air interface control policy.

25. The method for processing air interface information according to claim 24, wherein:

the air interface policy request is an exception processing request comprising a neighboring cell measurement result reported by a user equipment (UE), and the air interface control policy is a joint processing policy or a cell migration policy; or the air interface policy request is a radio resource allocation request, and the air interface control policy is a radio resource allocation result.

26. A method for processing air interface information, the method comprising:

receiving, by an enhanced base station configured without any radio data link layer (L2) and network layer (L3) control plane functions, through an open interface, an air interface control policy for radio L2 and L3 sent by a radio access network controller having an air interface control function of a radio access network, wherein the air interface control policy is generated by the radio access network controller; and processing, by the enhanced base station, air interface user plane data for radio L2 and L3 according to the air interface control policy;

wherein the radio L2 and L3 protocol control plane functions comprise radio resource allocation, uplink/downlink scheduling, scheduling priority selection, protocol error detection and recovery, control plane protocol encryption and decryption, broadcast, paging, Radio Resource Control (RRC) connection management, radio bearer management, mobility management, key management, user equipment (UE) measurement reporting and control, Multimedia Broadcast Multicast Service (MBMS) control, NAS message direct transfer and Quality of Service (QoS) management.

27. The method for processing air interface information according to claim 26, further comprising:

receiving, by the enhanced base station, a user plane data forwarding policy of an Internet protocol (IP) layer and layers above the IP layer which is sent by a network controller in a core network; and processing, by the enhanced base station, user plane data of the IP layer and the layers above the IP layer according to the data forwarding policy.

28. The method for processing air interface information according to claim 26, wherein, before receiving, by an enhanced base station through an open interface, an air interface control policy sent by a radio access network controller, the method comprises:

sending, by the enhanced base station, an air interface policy request to the radio access network controller through the open interface to request the air interface control policy.

29. The method for processing air interface information according to claim 28, wherein:

the air interface policy request is an exception processing request comprising a neighboring cell measurement result reported by a user equipment (UE), and the air interface control policy is a joint processing policy or a cell migration policy; or the air interface policy request is a radio resource allocation request, and the air interface control policy is a radio resource allocation result.

* * * * *